(12) United States Patent
Tsuchihashi et al.

(10) Patent No.: US 7,527,298 B2
(45) Date of Patent: May 5, 2009

(54) DUST FENDER FOR RIDING TYPE WORK VEHICLE

(75) Inventors: Hironori Tsuchihashi, Wakayama (JP); Koji Fujiwara, Sakai (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/854,065

(22) Filed: Sep. 12, 2007

(65) Prior Publication Data

US 2008/0072558 A1 Mar. 27, 2008

(30) Foreign Application Priority Data

Sep. 22, 2006 (JP) .............................. 2006-257106

(51) Int. Cl.
*B62D 25/18* (2006.01)
(52) U.S. Cl. .................................... 280/847; 180/68.6
(58) Field of Classification Search ................ 180/68.6, 180/68.1, 68.4; 296/198, 35.1, 37.3; 280/849, 280/850, 853, 854, 847; D12/106, 184
See application file for complete search history.

(56) References Cited

U.S. PATENT DOCUMENTS

| | | | | | |
|---|---|---|---|---|---|
| 2,537,707 | A | * | 1/1951 | Russ et al. | ................... 280/848 |
| 2,908,528 | A | * | 10/1959 | Richter | .................... 296/181.4 |
| 3,525,548 | A | * | 8/1970 | Mutka | ........................ 296/35.1 |
| 4,074,786 | A | * | 2/1978 | Joubert | ....................... 180/68.5 |
| D308,953 | S | * | 7/1990 | Godbersen | .................. D12/106 |
| 4,986,571 | A | * | 1/1991 | Godbersen | .................. 280/854 |
| D314,735 | S | * | 2/1991 | Godbersen | .................. D12/106 |
| 5,199,521 | A | * | 4/1993 | Samejima et al. | ........... 180/68.1 |
| 5,816,616 | A | * | 10/1998 | Boyd | .......................... 280/847 |
| 6,854,252 | B2 | * | 2/2005 | Foster | ........................ 56/320.1 |
| 2003/0029656 | A1 | * | 2/2003 | Matsuura et al. | ........... 180/68.2 |
| 2003/0046915 | A1 | * | 3/2003 | Samejima et al. | ............. 56/14.9 |
| 2005/0230992 | A1 | * | 10/2005 | Maeda et al. | ............... 296/37.1 |

FOREIGN PATENT DOCUMENTS

| | | | |
|---|---|---|---|
| JP | 11070201 A | * | 3/1999 |
| JP | 2003102230 A | * | 4/2003 |
| JP | 200637779 | | 2/2006 |

* cited by examiner

*Primary Examiner*—Árpád Fábián-Kovács
(74) *Attorney, Agent, or Firm*—The Webb Law Firm

(57) ABSTRACT

A riding work vehicle includes an engine hood provided at a rear portion of the vehicle body, an engine cooling air inlet provided at a front end area of the engine hood, and a mower connecting portion for connecting a mower to the vehicle body. A pair of right and left first fenders are supported to the vehicle body so as to be located above the front wheels or rear wheels. Second fenders are provided separately from the first fenders and overlapping at least partially with the first fenders as viewed from above. Second fender support portions support the second fenders to the vehicle body. Each one of the second fenders includes an overlapping portion overlapping with the first fender as viewed from above and a dust cover portion disposed laterally of the engine cooling air inlet.

7 Claims, 6 Drawing Sheets

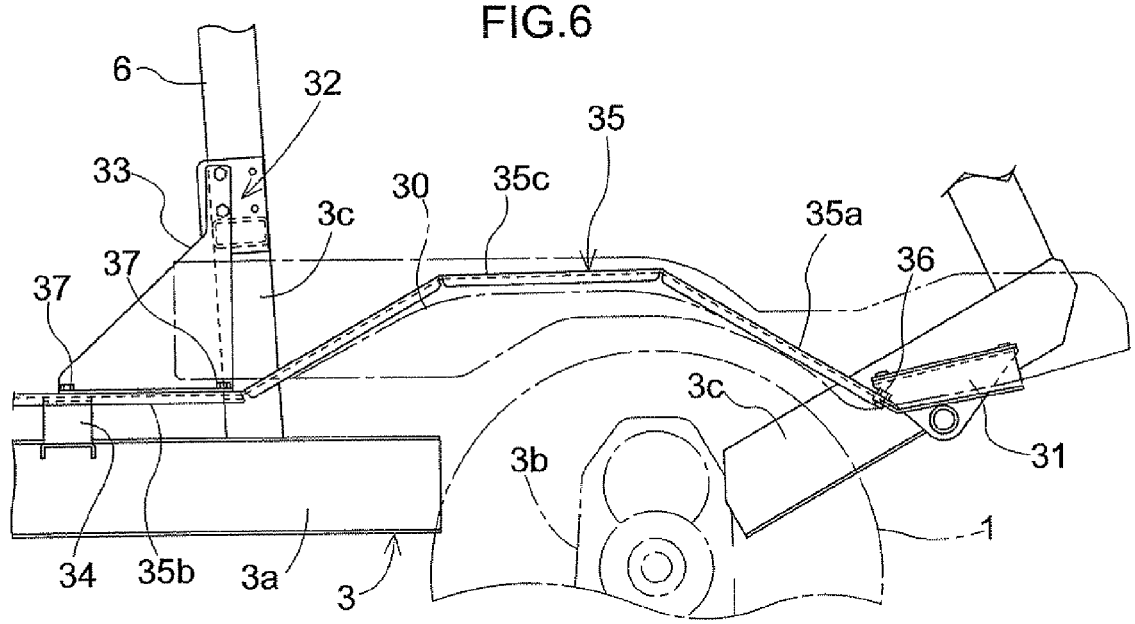
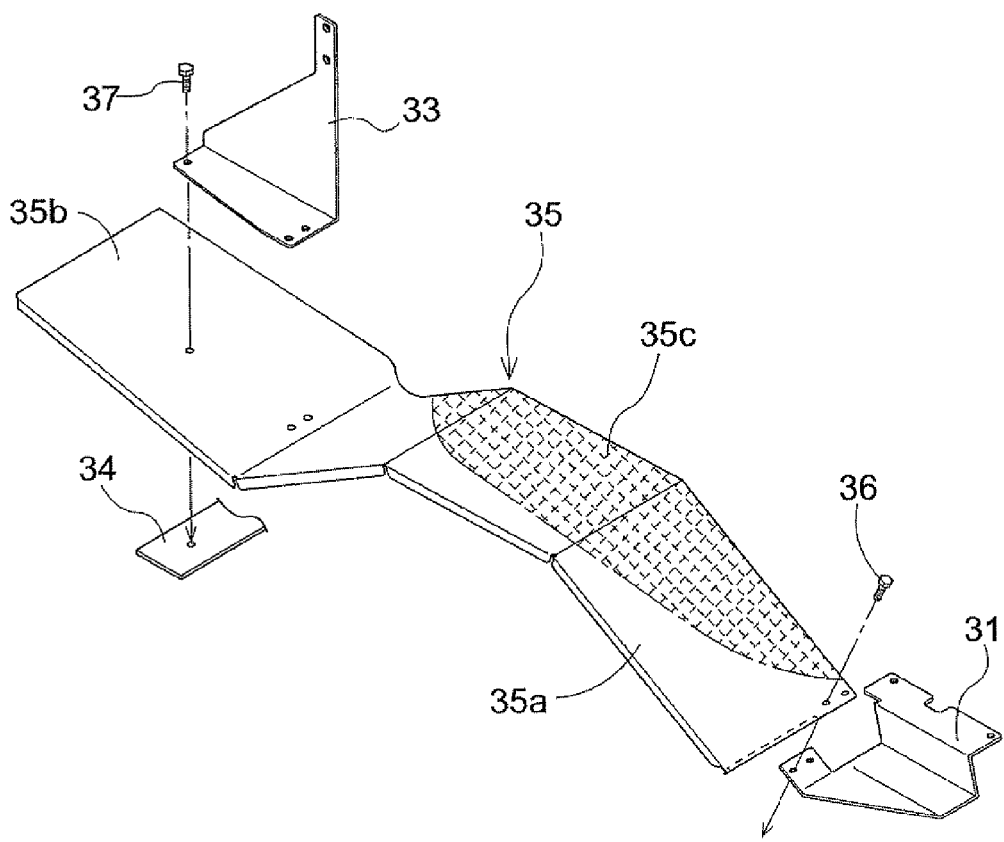

DUST FENDER FOR RIDING TYPE WORK VEHICLE

BACKGROUND OF THE INVENTION

The present invention relates to a riding type work vehicle, more particularly, to a dust fender provided additional to a conventionally mounted fender of the vehicle.

A riding work vehicle of the above-noted type is known from e.g. JP2006-37779.

The vehicle disclosed in the above document includes a traveling vehicle body, a steering wheel mounted at a front portion of the vehicle body and an engine hood mounted at a rear portion of the vehicle body. A mower is connected to a front portion of the vehicle body via lift arms. Further, an engine cooling construction is provided with attachment of a dustproof net to the front end of the engine hood, so that ambient air cleaned by passing the dustproof net may be introduced as cooling air to a radiator.

In this type of riding work vehicle, conventionally, front fenders are mounted on the vehicle body in such a manner as to cover the areas upwardly of the front wheels as viewed laterally of a driver's section.

In place of a side-discharge type mower configured to discharging cut grass pieces sideways, a rear-discharge type mower configured to discharge the cut grass pieces rearwards is sometimes connected so as to promote distribution of the cut grass pieces discharged from the mower over a wider area. In such case, if the conventional front fender related technique is employed, there is the risk of the cut grass pieces discharged from the lower causing a trouble in e.g. the cooling of the engine.

More particularly, in the case of the side-discharge type mower, the mowing operation can proceed with low possibility of swirling-up of the mowed grass pieces discharged from the mower. Further, the shorter the projecting length of the front fender to the lateral outer side of the vehicle body, the more advantageous for packing in connection with transport of the work vehicle. For these reasons, the front fender according to the prior art would be formed compact, with a relatively short projecting length to the lateral outer side of the vehicle body. Accordingly, if the rear-discharge type mower is connected thereto, mowed grass pieces discharged from this mower would "swirl up" in an uncontrolled manner in the periphery or the rear area of the front fender, so that the grass pieces may get stuck to the air inlet for engine cooling, or even enter the inside the engine hood to eventually get stuck to the radiator.

SUMMARY OF THE INVENTION

An object of the present invention is to provide a riding work vehicle which has solved at least one of the problems suffered in the prior art.

A riding work vehicle, according to the present invention, comprises:

a vehicle body supported by front wheels and rear wheels;

a driving section provided at a front portion of the vehicle body;

an engine hood provided at a rear portion of the vehicle body;

an engine cooling air inlet provided at a front end area of the engine hood;

a mower connecting portion for connecting a mower to the vehicle body at one of a position between the front wheels and the rear wheels and a position forwardly of the front wheels;

a pair of right and left first fenders supported to the vehicle body so as to be located above the front wheels or rear wheels corresponding thereto;

second fenders provided separately from the first fenders and overlapping at least partially with the first fenders as viewed from above; and a second fender support portion for supporting the second fenders to the vehicle body;

wherein each of said second fenders includes an overlapping portion overlapping with the first fender and a dust cover portion disposed laterally of said engine cooling air inlet as viewed from above.

Thus, the dust cover portions of the second fenders make it more difficult for cut grass pieces discharged from the mower to enter the engine cooling air inlet.

BRIEF DESCRIPTION OF THE DRAWINGS

FIG. 6 is a side view showing an enlarged front fender under its attached condition, and FIG. 7 is a perspective view of the enlarged front fender.

DETAILED DESCRIPTION OF PREFERRED EMBODIMENTS

Next, preferred embodiments of the invention will be described with reference to the accompanying drawings. In addition to a grass mower illustrated in this embodiment, the present invention is applicable to other types of work vehicles such as a so-called "zero-turn" mower.

Figure 1:
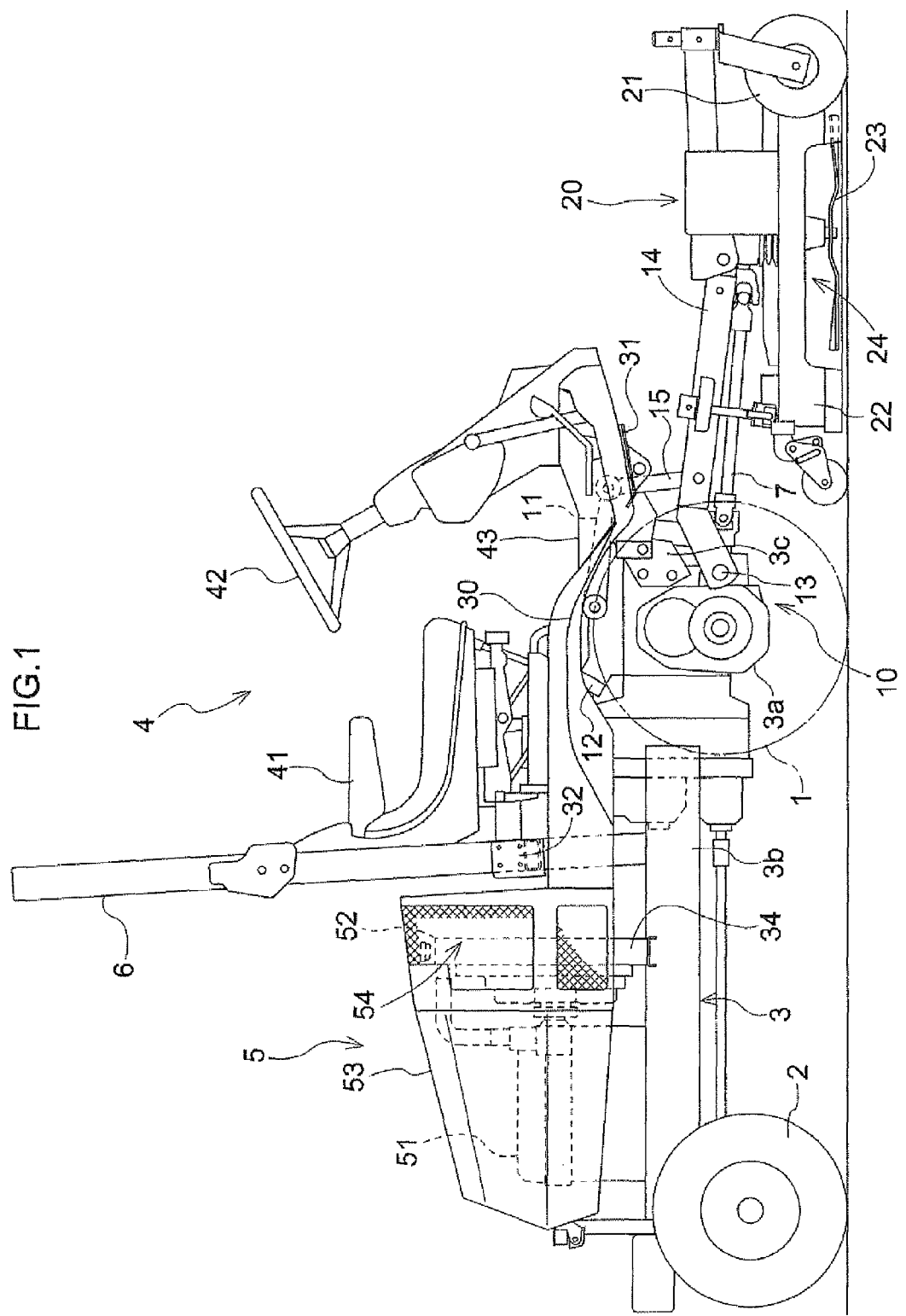
FIG. 1 is a side view showing a side-discharge type riding mower in its entirety.
Figure 2:
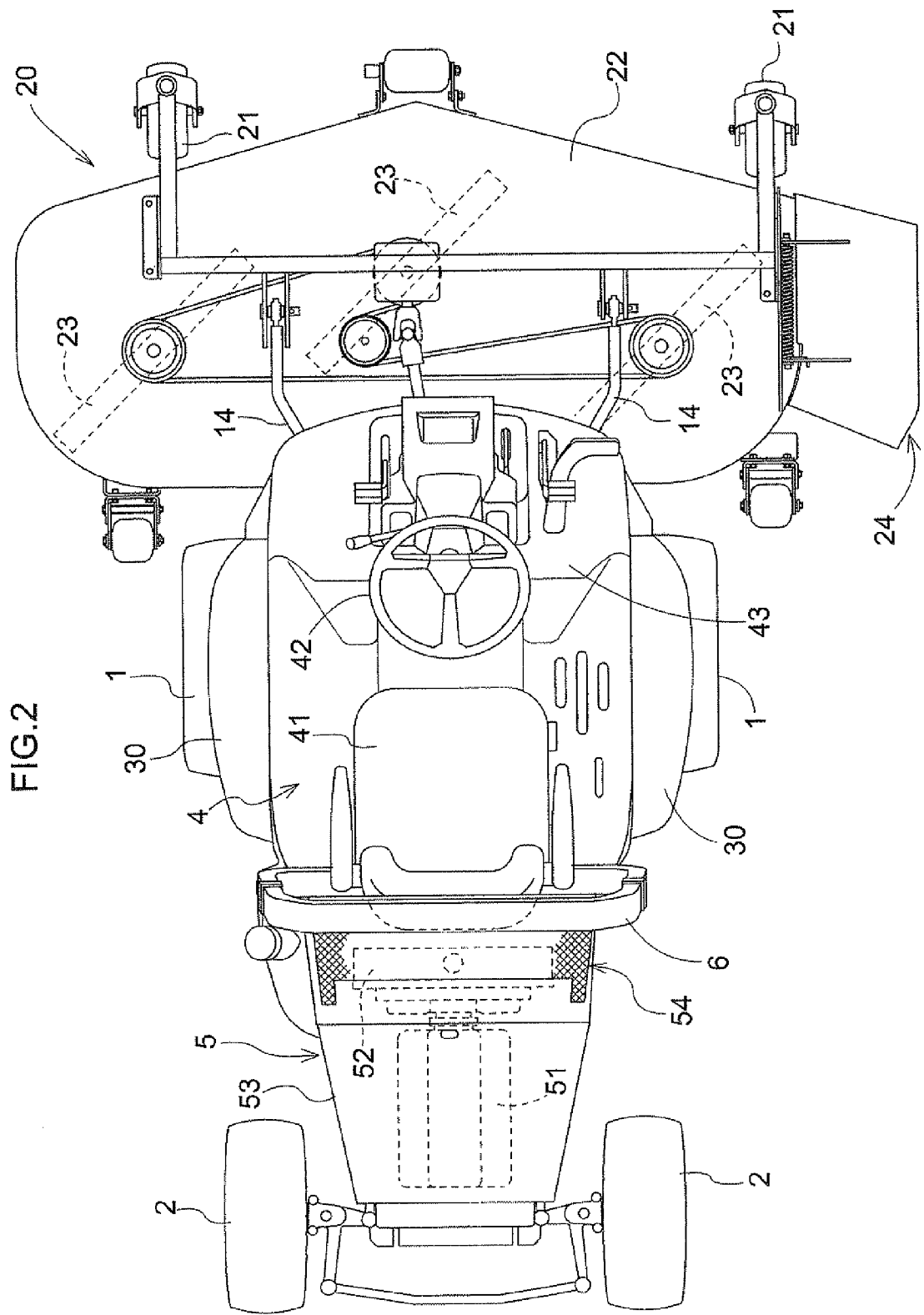
FIG. 2 is a plan view showing the side-discharge type riding mower in its entirety.

FIG. 1 is an overall side view of a riding mower including a riding work vehicle relating to the present invention. FIG. 2 is an overall plan view of the riding mower including the riding mower relating to the present invention. As shown in these figures, this riding mower includes the riding work vehicle relating to the embodiment of the present invention, and a side-discharge type mower 20 connected to a mower connecting portion 10 disposed at a front portion of a vehicle body frame 3 of this riding work vehicle.

This riding mower is provided for effecting a lawn mowing or grass mowing operation. That is, this riding work vehicle includes, in addition to the mower connecting portion 10, a pair of right and left drivable front wheels 1, 1, a pair of right and left steerable and drivable rear wheels 2, 2, a riding type driver's section 4 having a driver's seat 41 disposed at a front portion of the vehicle body frame 3, an engine section 5 having an engine 51 disposed at a rear portion of the vehicle body frame 3, and a rollover protection frame 6 disposed adjacent the rear end of the driver's seat 41. The mower connecting portion 10 includes lift arms 11 attached to opposed lateral sides of an upper portion of a transmission case 3a constituting a front portion of the vehicle body frame 3, with the lift arms 11 being vertically pivotable. The mower connecting portion 10 further includes a hydraulic lift cylinder 12 disposed inside the transmission case 3a and link pivot shafts 13 provided on the opposed lateral sides of a lower portion of the transmission case 3a. That is, with this mower connecting portion 10, by means of lift links 14 extending from the pair of right and left link pivot shafts 13 forwardly of the vehicle body and vertically pivotable relative thereto, the mower 20 is disposed at a position more forwardly of the vehicle body than the right and left front wheels 1 and connected to be lifted up/down and detachably attached thereto. Further, as the lift cylinder 12 vertically pivots the right and left lift arms 11, 11, so that the left lift arm 11 vertically pivots the left lift link 14 via a lift rod 15 and the right lift arm 11 vertically pivots the right lift link 14 via a lift rod 15, respectively. With these, the mower 20 is lowered to a lowered working condition in which a ground-contact gauge wheel 21 is placed in contact with the ground surface or is lifted to an lifted-up non-working condition in which the ground-contact gauge wheel 21 is lifted up off the ground surface. The mower 20 includes, in addition to the ground-contact gauge wheel 21, a cutter blade housing 22 supported to the right and left lift links 14, 14, a plurality of rotary cutter blades 23 mounted inside this cutter blade housing 22 and disposed side by side along the lateral direction of the mower, and a cut grass discharge outlet 24 provided at one lateral end of the cutter blade housing 22. When the work vehicle is driven to travel with the mower 20 being set to the lowered-working condition, the mower 20 will drive the respective cutter blades 23 about respective vertical axes thereof by a drive force from the engine 51 transmitted from the transmission case 3*a* via a rotary shaft 7, so that a lawn mowing operation or a grass mowing operation is effected by the respective rotary cutter blades 23. Then, with an air current generated in association with the rotation of the respective cutter blades 23, the cut lawn or grass pieces will be transported inside the cutter blade housing 22 along the lateral direction and eventually discharged to the lateral outer side of the cutter blade housing 22 via a cut grass discharge outlet 24.

Next, the construction of the riding work vehicle will be described in greater details.

As shown in FIGS. 1 and 2, the vehicle body frame 3 includes the transmission case 3*a* drivingly supports the right and left pair of front wheels 1, 1, a pair of main frames 3*b*, 3*b* oriented along the fore and aft direction of the vehicle body and having front end portions thereof connected to opposed lateral portions of the transmission case 3*a*, and a driving section frame 3*c* disposed at an upper portion of the transmission case 3*a*.

As shown in FIGS. 1 and 2, the driving section 4 includes, in addition to the driver's seat 41 supported to the driving section frame 3*c*, a steering wheel 42 disposed forwardly of the driver's seat 41 and a driving section floor 43. The driving section floor 43 includes a driving step portion disposed forwardly and downwardly of the driver's seat 41 and a cover portion disposed downwardly of the driver's seat 41 to cover the space above the transmission case 3*a*.

Figure 3:
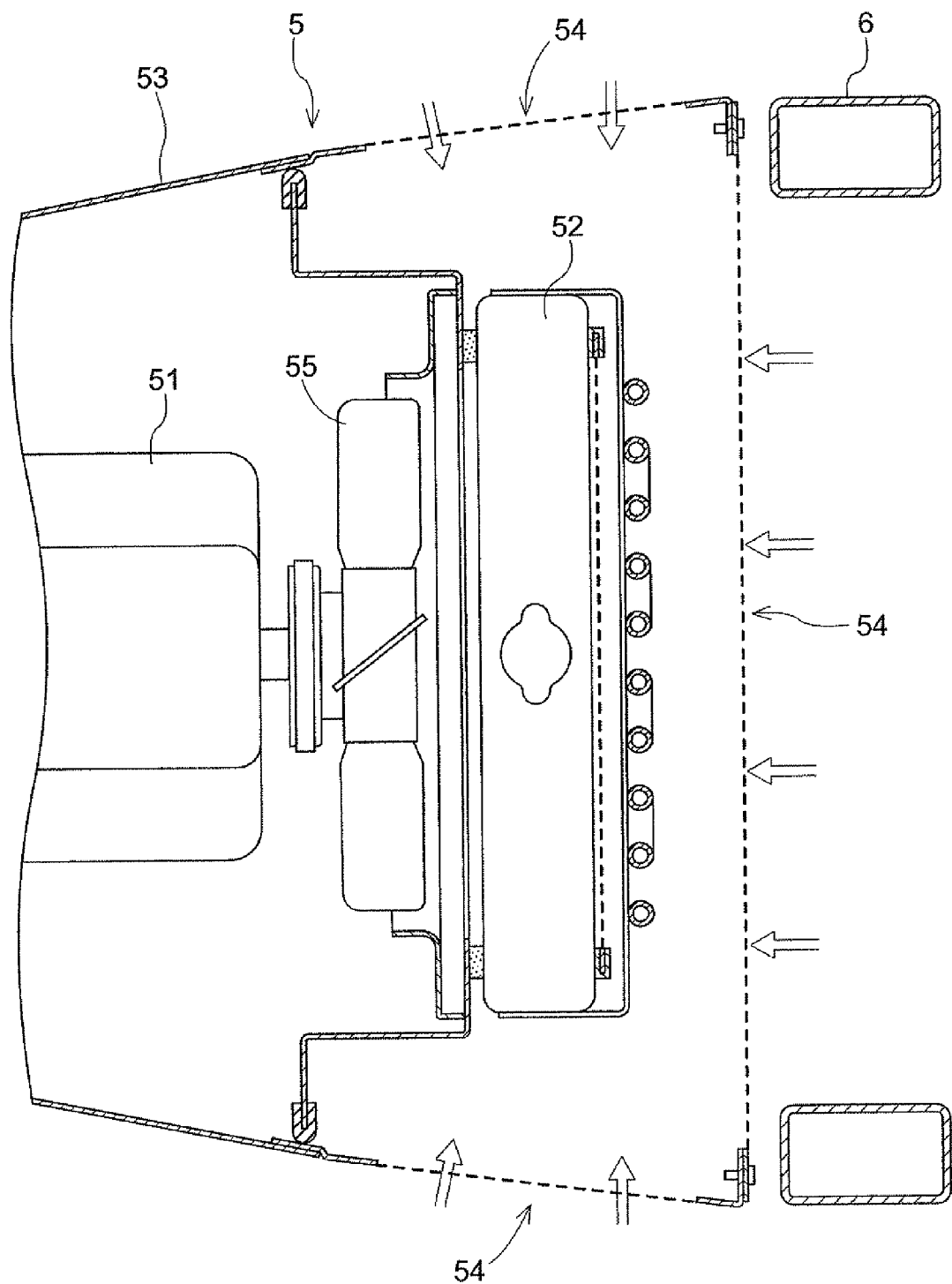
FIG. 3 is a plan view showing a portion of an engine section.

As shown in FIGS. 1 and 2, the engine section 5 includes the engine 51 mounted to rear portions of the pair of right and left main frames 3*b*, 3*b*, an engine cooling radiator 52 disposed forwardly of the engine 51 relative to the vehicle body, an engine hood 53 for covering the engine 51 and the radiator 52, and an engine cooling air inlet 54 provided at the front end of the engine hood 53, with a dustproof net attached thereto. As shown in FIG. 3, the engine cooling air inlet 54 is open on the opposed lateral sides and the upper side of the vehicle body. In operation of the engine section 5, with an air blasting action of a rotary cooling fan 55 (see FIG. 3) driven by the engine 51, air present outside the engine hood 53 is introduced through the engine cooling air inlet 54 to the vicinity of the radiator 52 disposed inside the engine hood. In this way, engine cooling air current is generated and fed to the radiator 52.

As shown in FIGS. 1 and 2, the work vehicle includes a pair of right and left front fenders 30 disposed on the opposed lateral sides of the driving section 4. These right and left front fenders 30 ("first fenders") are configured to cover the spaces upwardly of vehicle-body inner side portions of the front wheels 1. Also, the right and left front fenders 30 are formed integral with the lateral ends of the driving section floor 43 when this driving section floor 43 is formed of a resin material. The work vehicle further includes a pair of front and rear second fender support portions 31, 32 (to be referred to simply as "fender support portions" hereinafter) disposed on the opposed lateral sides of the vehicle body frame 3 and provided in distribution on the front and rear sides of the front wheels 1 respectively. The front side fender support portions 31 disposed on the opposed lateral sides of the vehicle body frame 3 are constructed from metal plate members supported to the driving section frame 3*c*, to which front ends of enlarged front fenders 35 (second fenders) shown in FIGS. 6 and 7 are detachably connected with connecting bolts 36. The rear side fender support portions 32 provided on the opposed lateral sides of the vehicle body are provided in a protection frame support 3*c* for supporting the rollover protection frame 6 to the main frames 3*b*. Referring to the rear side fender support portion 32, one end of a stay 33 detachably attached to this fender support portion 32 is bolt-connected. And to the rear end of this stay 33, the rear end of the enlarged front fender 35 is detachably connected with a connecting bolt 37, whereby the rear end portion of the enlarged front fender 35 is detachably supported. A support arm 34 shown in FIGS. 6 and 7 is attached to the vehicle body frame 3 so as to receive and support, from under, the rear end portion of the enlarged front fender 35.

As shown in FIGS. 6 and 7, the enlarged front fender 35 is formed of a metal plate member which is bent to form a front fender body 35*a* at the front end thereof, a dust cover portion 35*b* at the rear end thereof, and an overlapping portion 35*c* disposed on the inner side of the front fender body 35*a* in the lateral direction of the vehicle body. Then, as the enlarged front fender 35 is supported by the front side fender support portion 31 and the rear side fender support portion 32, the enlarged front fender 35 will have its overlapping portion 35*c* overlapped above the front fender 30 with a slight gap relative thereto, thus covering, at a portion of the front fender body 35*a* projecting to the outer side from the front fender 30, the space above the portion of the front wheel 1 located on the outer side of the front fender 30. Further, the dust cover portion 35*b* of the enlarged front fender 35 will be disposed rearwardly of the front fender 30 relative to the vehicle body and laterally of the engine cooling air inlet 54, thus covering the space between the front and rear wheels on the lateral side of the engine cooling air inlet 54.

Figure 4:
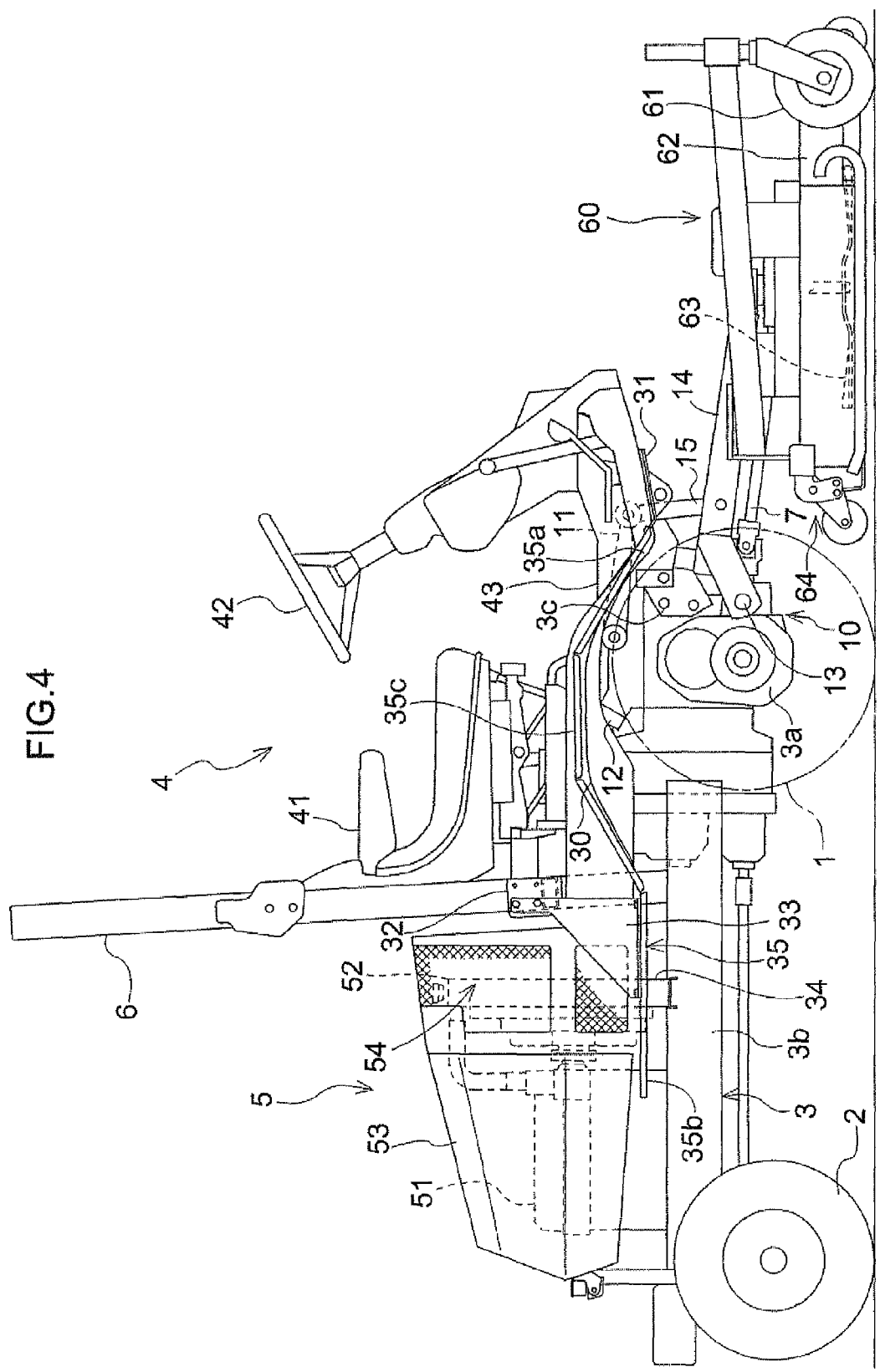
FIG. 4 is a side view showing a rear-discharge type riding mower in its entirety.
Figure 5:
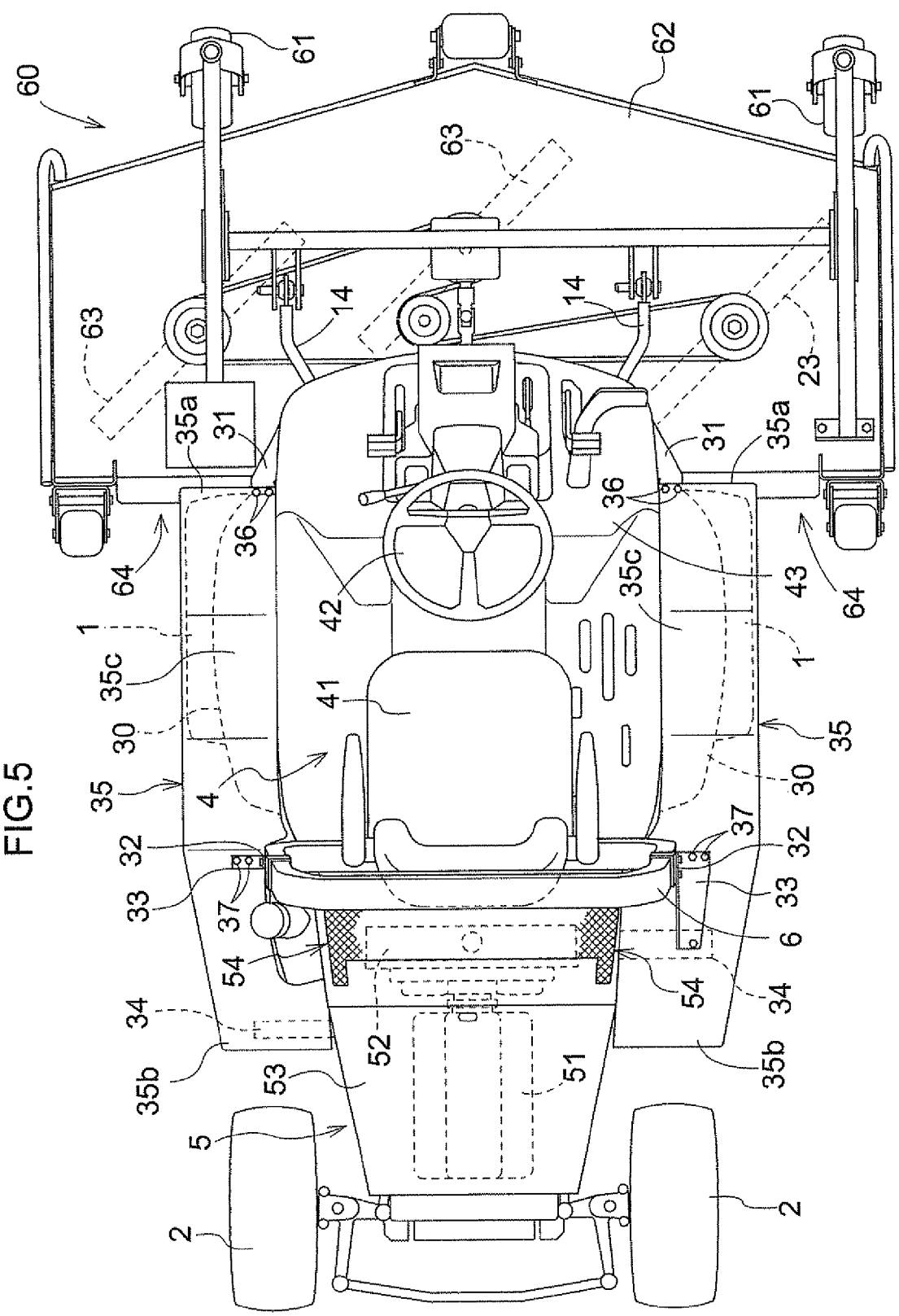
FIG. 5 is a plan view showing the rear-discharge type riding mower in its entirety.

FIG. 4 is an overall side view of a rear-discharge type riding mower. FIG. 5 is an overall side view of the rear-discharge type riding mower. As shown in these figures, in this rear-discharge type riding mower, to the riding work vehicle relating to the present invention, instead of the side-discharge type mower 20 described above, a rear-discharge type mower 60 is connected by the mower connecting portion 10. This mower 60 includes a cutter blade housing 62 supported to the pair of right and left lift links 14, 14, a plurality of rotary cutter blades 63 mounted inside the cutter blade housing 62 and disposed side by side along the lateral direction of the mower, a cut grass discharge outlet 64 provided at a rear portion of the cutter blade housing 62, and a ground contacting gauge wheel 61 supported to the cutter blade housing 62. In operation, when the work vehicle is driven to travel with the mower 60 being lowered to the lowered-working condition by the mower connecting portion 10, the mower 60 will drive the respective cutter blades 63 about their respective vertical mower axes by a drive force from the engine 51 transmitted from the transmission case 3a via the rotary shaft 7, so that a lawn mowing operation or a grass mowing operation is effected by the respective rotary cutter blades 63. Then, with an air current generated in association with the rotation of the respective cutter blades 63, the cut lawn or grass pieces will be transported inside the cutter blade housing 62 along the lateral direction and eventually discharged to the lateral outer side of the cutter blade housing 62 via the cut grass discharge outlet 64.

As shown in FIGS. 4 and 5, in case the rear-discharge mower 60 is connected as above, the enlarged front fenders 35 are attached to the opposed lateral sides of the vehicle body. With this, the front fender body portions 35a and the dust cover portions 35b of the enlarged front fenders 35 will effectively prevent the cut lawn or grass pieces discharged from the mower 60 to the rear outer side from the cutter blade housing 62 from being swirled up to the upper side of the vehicle body in the vicinity of the front wheels 1 or between the front and rear wheels. As a result, the work is possible while effectively preventing the cut lawn or grass pieces from getting stuck to the engine cooling air outlet 54 or entering the inside of the engine hood through this engine cooling air inlet 54.

OTHER EMBODIMENTS

In the foregoing embodiments, the present invention is applied to the riding work vehicle having the mower connecting portion 10 for connecting the mower 20 or 60 at the position forwardly of the front wheels. Instead, the present invention is applicable to a riding work vehicle adapted for connecting the mower 20, 60 between the front and rear wheels. That is, the present invention is applicable also to a so-called "zero-turn" mower. In such case, the "first fenders" are the fenders disposed upwardly of the rear wheels and the "second fenders" are the fenders which are at least partially overlapped with the first fender as viewed from above.

What is claimed is:
1. A riding work vehicle comprising:
a vehicle body supported by front wheels and rear wheels;
a driving section provided at a front portion of the vehicle body;
an engine hood provided at a rear portion of the vehicle body;
an engine cooling air inlet provided at a front end area of the engine hood;
a mower connecting portion for connecting a mower to the vehicle body at a position selected from the group consisting of: between the front wheels and the rear wheels and forwardly of the front wheels;
a pair of right and left first fenders supported to the vehicle body so as to be located above the front wheels or the rear wheels; and
second fenders removably attached to the vehicle body through second fender support portions, each of said fenders including:
a front fender body forming a front end region of the second fender;
a dust cover portion forming a rear end region of the second fender disposed laterally of the engine cooling air inlet and having a surface extending laterally outward to prevent foreign matters from being swirled up from the ground and entering the engine cooling air inlet;
an overlapping portion connected to the front fender body at one end thereof and connected to the dust cover portion at the other end thereof thereby forming a rear end region of the second fender;
wherein said front fender body and said overlapping portion have projecting portions projecting laterally outward from each of said first fenders such that side ends of the front fender body and the overlapping portion are located laterally outward from a lateral outside edge of each first fender.

2. The riding work vehicle of claim 1, wherein said first fenders are formed integral with a bottom portion of said driving section.

3. The riding work vehicle of claim 1, wherein a rear end of said dust cover portion is located rearwardly of a rear end of said engine cooling air inlet in a side view.

4. The riding work vehicle of claim 1, wherein each of said second fenders includes a front inclined portion, a center horizontal portion extending rearwardly from a rear end of said front inclined portion, a rear inclined portion extending rearwardly from a rear end of said center horizontal portion, and a horizontal portion extending rearwardly from a rear end of said rear inclined portion.

5. The riding work vehicle of claim 1, further comprising front side fender support portions and rear side fender support portions to removably attach said second fenders to the vehicle body, said front side fender portions being supported by driving section frames and said rear side fender portions being supported by main frames.

6. The riding work vehicle of claim 5, wherein said rear side fender support portions are supported by the main frames through a protection frame and members associated with the protection frame.

7. The riding work vehicle of claim 1, wherein the overlapping portion of each of said second fenders is disposed above the front fender with a gap formed therebetween.

* * * * *